US005419665A

United States Patent [19]

Adams et al.

[11] Patent Number: 5,419,665

[45] Date of Patent: May 30, 1995

[54] NON-METALLIC NUT RING

[75] Inventors: Thomas R. Adams, Huntington Beach; Gary R. Wittman, Costa Mesa, both of Calif.

[73] Assignee: Tiodize Company, Inc., Huntington Beach, Calif.

[21] Appl. No.: 221,835

[22] Filed: Apr. 1, 1994

[51] Int. Cl.[6] .......... F16B 27/00; F16B 37/00

[52] U.S. Cl. .......... 411/84; 411/301; 411/427; 411/908; 264/328.18

[58] Field of Search .......... 411/84, 301, 427, 436, 411/908; 264/328.1, 328.17, 328.18

[56] References Cited

U.S. PATENT DOCUMENTS

| | | | |
|---|---|---|---|
| 856,246 | 6/1907 | Gamon | 411/84 |
| 3,030,997 | 4/1962 | Collins | 411/301 |
| 4,812,247 | 3/1989 | Fahner et al. | 264/328.18 |
| 4,927,579 | 5/1990 | Moore | 264/328.18 |
| 5,061,423 | 10/1991 | Layden | 264/328.18 |
| 5,079,055 | 1/1992 | Doyle | 411/908 X |
| 5,080,547 | 1/1992 | Moghe | 411/908 X |

*Primary Examiner*—Neill R. Wilson

*Attorney, Agent, or Firm*—Hawes & Fischer

[57] ABSTRACT

A one-piece non-metallic nut ring for surrounding and supporting an electrical connector attached to a bulkhead or other flat panel. The nut ring includes a planar backplate and threaded nuts extending outwardly therefrom. The backplate and nuts are coextensively and continuously connected to one another by compression molding a matrix of resin impregnated, non-metallic fibers. The non-metallic fibers are preferably short chopped fibers that are randomly dispersed within the matrix in directions extending generally parallel to the plane of the backplate. The nut ring of this invention is characterized as being of relatively light weight, corrosion resistant, non-conductive and able to withstand detection by radar.

8 Claims, 2 Drawing Sheets

NON-METALLIC NUT RING

BACKGROUND OF THE INVENTION

1. Field of the Invention

This invention relates to a one-piece non-metallic nut ring for surrounding and retaining an electrical connector at a bulkhead. The nut ring is as strong as a conventional metallic nut ring, but is lighter in weight, non-conductive and corrosion resistant.

2. Background Art

Metallic nut rings have been used in the past to secure the detachable halves of a two-part electrical connector at respective opposite sides of a bulkhead or similar flat panel. In many cases, the backplate of the conventional nut ring is stamped from an aluminum sheet and metallic nuts are pressed through holes at each of the corners thereof. The metallic nuts are threaded to receive complementary threaded metallic fasteners (e.g. screws) by which to secure the backplate against a side of the bulkhead in surrounding engagement with one half of the two-part electrical connector. However, the all metal nut ring is relatively heavy which increases the total weight of the fixture to which the nut ring is connected, particularly when the fixture carries many electrical connectors. Moreover, it has been found that when a strong driving force is applied to the screws during attachment of the metallic nut ring at a bulkhead, the aluminum backplate is not strong enough to retain the nuts in place. Consequently, the screws may force the nuts to pop out of the backplate, thereby causing the metallic nut ring to fail.

In other cases, the backplate of the nut ring has been made of injection molded plastic to better retain the metallic nuts in place when subjected to critical loads. However, the resulting metal-plastic hybrid nut ring still requires both metallic and plastic parts and a separate operation for pressing the metallic nuts in the non-metallic backplate. The foregoing contributes to increasing the cost and time associated with manufacturing such hybrid nut rings.

SUMMARY OF THE INVENTION

A non-metallic nut ring is disclosed which overcomes the aforementioned problems inherent with the metallic and hybrid nut rings of the prior art. The non-metallic nut ring of the present invention includes a C-shaped backplate and a plurality of nuts projecting therefrom. Each of the backplate and nuts are formed from a matrix of (e.g. epoxy) resin impregnated chopped fibers. In accordance with a preferred embodiment, the fibers are formed from S-glass and are randomly oriented in the matrix so as to extend in directions which run generally parallel to the plane of the backplate. However, it is desirable that the fibers not extend in a direction that is perpendicular to the plane of the backplate.

The nut ring is compression molded so that the backplate and nuts projecting therefrom are formed as a single and continuous piece. The nuts are then tapped and threaded to be adapted to receive complementary threaded fasteners (e.g. screws) therethrough. It is preferable that the threads of the nuts be slightly tapered in order to enhance the interlock between the nuts and their complementary screws.

The non-metallic nut ring of the present invention is as strong as but lighter than the conventional all metal nut ring. Being that the backplate and the nuts thereof are integrally molded as a single piece, the nuts are not susceptible to popping out of the backplate during installation. Moreover, the non-metallic nut ring is atmospherically non-corrosive and will not contribute to galvanic corrosion at the interface with an electrical connector and the bulkhead. What is more, the nut ring is both non-conductive and invisible to radar in those applications in which detection by radar is to be avoided.

DETAILED DESCRIPTION

Figure 1:
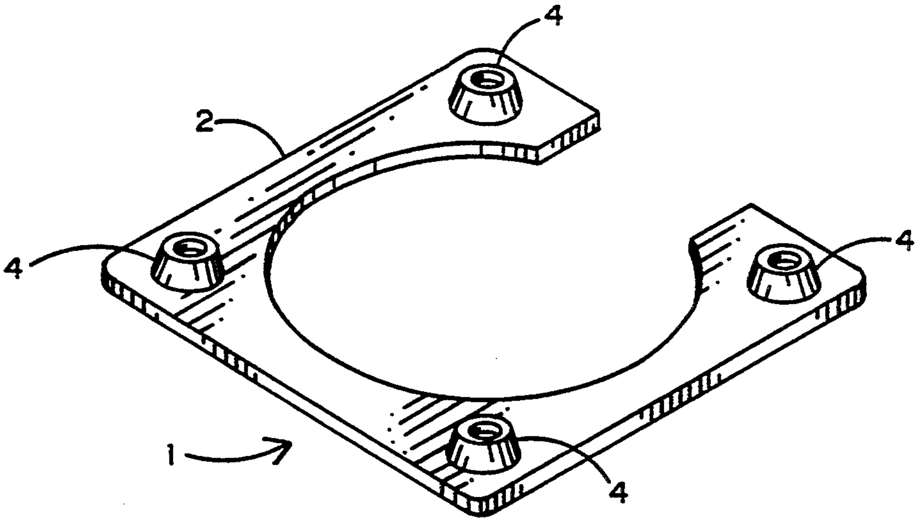
FIG. 1 is a perspective view of the non-metallic nut ring which forms the present invention.
Figure 2:
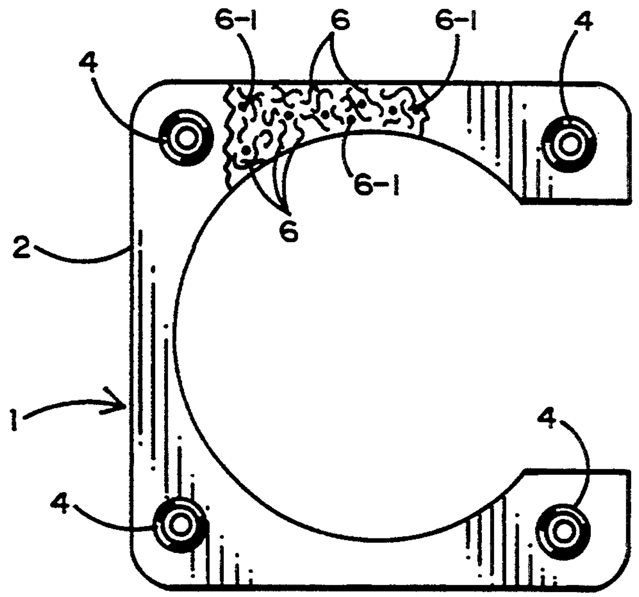
FIG. 2 is a top plan view of the nut ring of FIG. 1.
Figure 3:
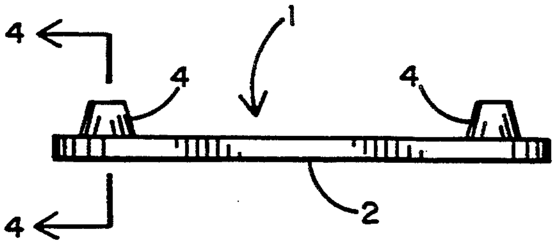
FIG. 3 is a side elevation of the nut ring of FIG. 1.

The non-metallic nut ring 1 which forms the present invention is now described in detail while referring concurrently to FIGS. 1–4 of the drawings. The nut ring 1 has a planar, C-shaped backplate 2 with a threaded nut 4 extending from each corner of the backplate. As is best shown in FIG. 2, the nut ring 1 is manufactured from a matrix of relatively short, chopped fibers 6 that are randomly aligned with one another. The fibers 6 are formed from a non-metallic material (e.g. S-glass) and are impregnated with a non-metallic resin, such as epoxy, or the like.

More particularly, to maximize the structural integrity and strength of the nut ring 1 relative to conventional all-metal nut rings, it is preferable that substantially all of the fibers 6 in the matrix extend in directions which are generally parallel to the plane of the backplate 2. In this regard, and while it is similarly preferable that virtually none of the fibers 6 extend in a direction that is perpendicular to the plane of the backplate 2, a few of the fibers 6-1 may extend in this perpendicular direction merely to prevent a possible delamination of the nut ring 1. The nuts 4 projecting from the backplate 2 are formed from the same resin impregnated fibers used to manufacture the backplate. Therefore, the directions of the fibers 6 which form the nuts 4 continue to run generally parallel to the plane of backplate 2.

In accordance with a preferred embodiment of this invention, the nut ring 1 is made by means of a conventional compression molding technique, whereby the backplate 2 and nuts 4 are coextensively and integrally connected together. Thus, the nut ring 1 is advantageously formed as a single, non-metallic piece, thereby avoiding the necessity of having an available supply of sheet metal stock and completing a multi-step assembly process as has otherwise been required to form conventional two-part nut rings. Moreover, the continuity between the backplate 2 and the nuts 4 will minimize the possibility that the nuts will separate from the backplate under extreme loads, such as those forces which may be generated through the nuts during installation of the nut ring 1.

Figure 4:
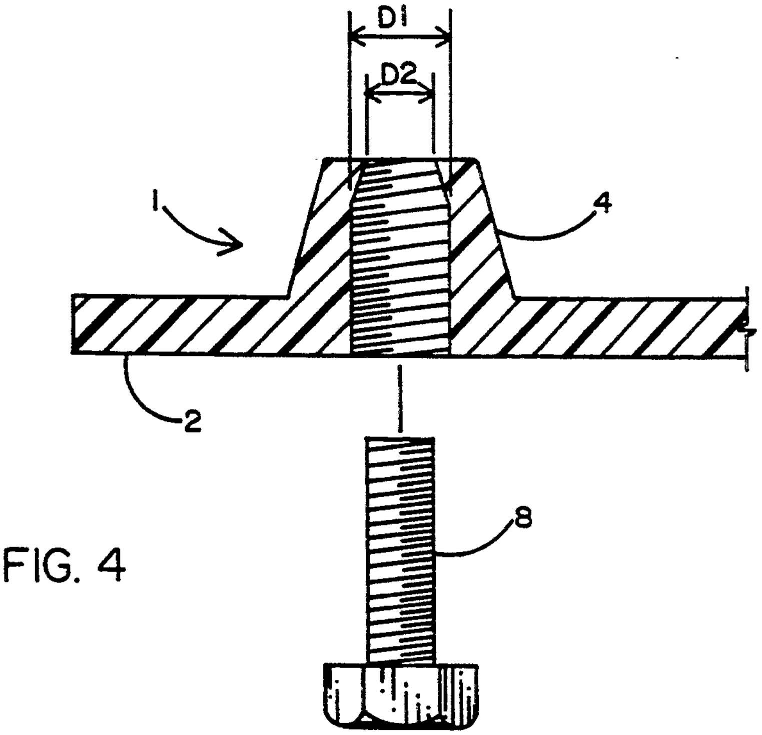
FIG. 4 is a cross-section taken along lines 4—4 of FIG. 3.

Once the one-piece nut ring 1 of this invention is compression molded, the nuts 4 are tapped and threaded so as to be adapted to receive a correspondingly threaded fastener, such as a screw 8 illustrated in FIG. 4. In order to increase the locking interface between a threaded nut 4 and a threaded screw 8, the thread of each nut may be tapered. That is to say, the last few threads of the nut 4 which receive the screw 8 are characterized by a diameter (designated D1 in FIG. 4) which is approximately 0.002 inches smaller than the diameter (designated D2) of the remaining threads.

Figure 5:
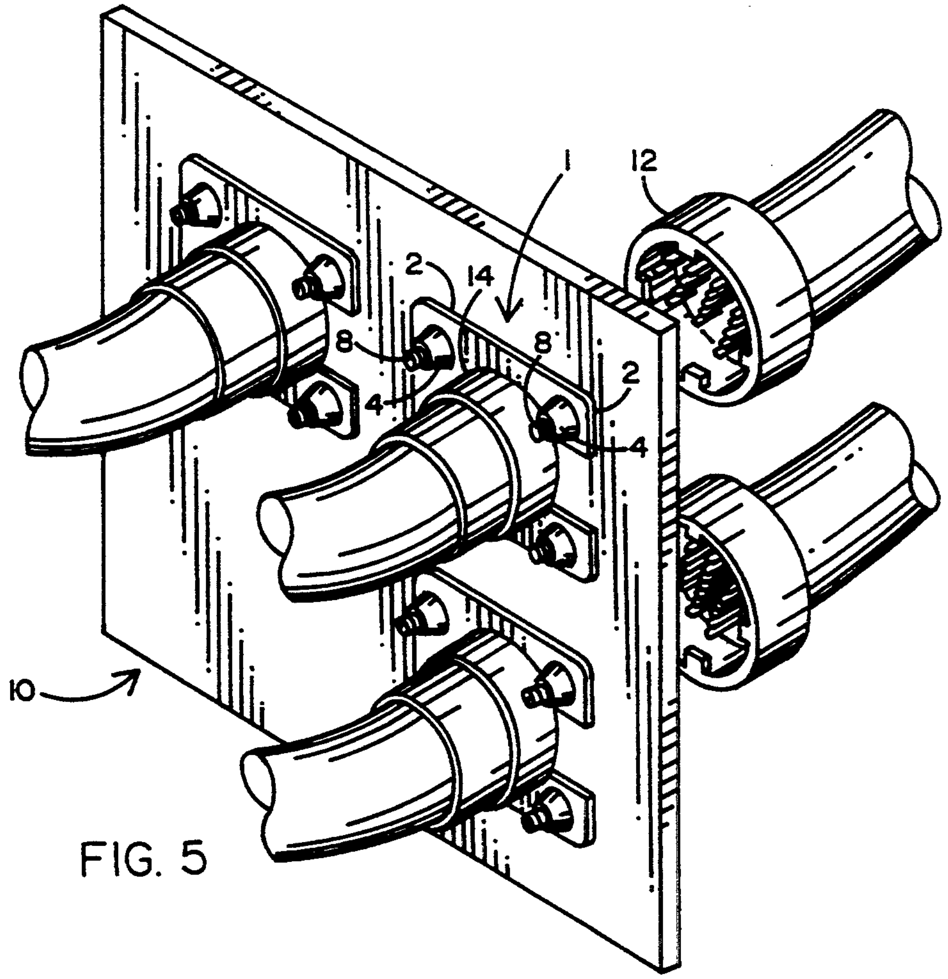
FIG. 5 shows the nut ring being used for supporting an electrical connector at one side of a bulkhead.

Referring now to FIG. 5 of the drawings, the nut ring 1 of this invention is shown having particular application for installing detachable two-part electrical connectors at the opposing sides of a flat bulkhead 10 or similar panel. By way of example, the two-part connector illustrated herein includes a male connector 12 and a female connector 14. The nut ring 1 surrounds and supports one of the connectors (e.g. 14) at one side of the bulkhead 1 so that the other connector (e.g. 12) can be quickly and easily mated to the first connector at the opposite side of the bulkhead 10 by way of an opening formed therethrough. More particularly, screws 8, or similar fasteners, are located within each of the nuts 4 of the nut ring 1 so as to secure the backplate 2 flush against the bulkhead 10 in surrounding engagement with the corresponding connector 14. To this end, a nut ring 1 can be mounted at each side of the bulkhead 10 so that both connectors 12 and 14 may be reliably mated to one another.

The non-metallic nut ring 1 of this invention is as strong as but lighter than conventional all-metal nut rings. In fact, the total weight of the nut ring 1 can be reduced by approximately 15% relative to a metal nut ring so as to substantially reduce the total weight of a fixture having many bulkheads and electrical connectors attached thereto. The non-metallic nut ring 1 is also atmospherically non-corrosive so that it will not contribute to galvanic corrosion with the usually metallic screws 8, bulkhead 10 or connectors 12 and 14. Similarly, the non-metallic nut ring 1 is both non-conductive and invisible to radar. The ability to avoid radar detection and reduce weight are desirable characteristics in certain high-performance aircraft.

It will be apparent that while a preferred embodiment of the invention has been shown and described, various modifications and changes may be made without departing from the true spirit and scope of the invention. For example, while the backplate 2 of nut ring 1 has been shown and described as having a C-shape, it is to be understood that this is not to be regarded as a limitation of the present invention. More particularly, the backplate 2 may have other shapes, including that of a circle, a square, or the like.

Having thus set forth the preferred embodiment of the instant invention, what is claimed is:

1. A non-metallic nut ring to be attached to a flat surface for surrounding and supporting a connector located at said flat surface, said nut ring comprising a planar backplate and at least one nut extending outwardly therefrom, each of said backplate and said nut being formed entirely from a matrix of short chopped, non-metallic resin impregnated fibers, said matrix of resin impregnated fibers extending from said backplate to said nut, such that said backplate is integrally connected to said nut by said matrix of fibers.

2. The non-metallic nut ring recited in claim 1, wherein said matrix of resin impregnated fibers which forms said backplate and said nut is compression molded to form a one-piece nut ring.

3. The non-metallic nut ring recited in claim 1, wherein substantially all of said non-metallic fibers extend randomly relative to one another in said matrix and in directions which are generally parallel to the plane of said backplate.

4. The non-metallic nut ring recited in claim 1, wherein said non-metallic fibers are formed from S-glass and impregnated by epoxy resin.

5. The non-metallic nut ring recited in claim 1, wherein said backplate has a C-shape.

6. The non-metallic nut ring recited in claim 1, wherein said at least one nut is threaded to retain a threaded fastener to be received therethrough for attaching said backplate to the flat surface, the thread of said nut ring being tapered to better mate with the fastener.

7. The non-metallic nut ring recited in claim 6, wherein the diameter of said threaded nut is the smallest at the end of said nut located farthest from said backplate from which said nut extends.

8. A method for forming a one-piece nut ring to be attached to a flat surface for surrounding and supporting a connector located at said flat surface, said method comprising the step of molding a matrix of non-metallic resin impregnated fibers to form a planar backplate and at least one nut extending therefrom, such that substantially all of said fibers are dispersed randomly relative to one another in said matrix in directions which are generally parallel to the plane of said backplate.

* * * * *